(12) United States Patent
Fong et al.

(10) Patent No.: US 8,079,027 B2
(45) Date of Patent: Dec. 13, 2011

(54) PROGRAMMING LANGUAGE TRANSLATION SYSTEMS AND METHODS

(75) Inventors: David Fong, San Jose, CA (US); Stanley John, Fremont, CA (US); Zheng (Joy) Zhang, Shanghai (CN); Qi (Christine) Chen, Shanghai (CN)

(73) Assignee: Via Technologies, Inc., Taipei (TW)

( * ) Notice: Subject to any disclaimer, the term of this patent is extended or adjusted under 35 U.S.C. 154(b) by 1463 days.

(21) Appl. No.: 11/530,043

(22) Filed: Sep. 8, 2006

(65) Prior Publication Data

US 2008/0127163 A1    May 29, 2008

(51) Int. Cl.
*G06F 9/44* (2006.01)
*G06F 9/45* (2006.01)

(52) U.S. Cl. ........ 717/170; 717/136; 717/137; 717/168; 717/169

(58) Field of Classification Search .................. None
See application file for complete search history.

(56) References Cited

U.S. PATENT DOCUMENTS

| | | | |
|---|---|---|---|
| 6,031,993 A * | 2/2000 | Andrews et al. | 717/143 |
| 6,289,510 B1 * | 9/2001 | Nakajima | 717/170 |
| 6,442,516 B1 * | 8/2002 | Lee et al. | 704/8 |
| 6,931,623 B2 * | 8/2005 | Vermeire et al. | 717/108 |
| 7,165,243 B1 * | 1/2007 | Pelegri-Llopart et al. | 717/136 |
| 7,296,261 B2 * | 11/2007 | Witchel et al. | 717/136 |
| 7,322,029 B2 * | 1/2008 | Diaz | 717/168 |
| 7,516,441 B2 * | 4/2009 | Hamilton et al. | 717/110 |
| 7,644,357 B2 * | 1/2010 | Aoyama | 715/249 |
| 7,689,983 B2 * | 3/2010 | Kitayama | 717/170 |
| 7,774,746 B2 * | 8/2010 | Mansfield et al. | 717/106 |
| 7,814,415 B2 * | 10/2010 | Cox | 715/249 |
| 7,844,958 B2 * | 11/2010 | Colton et al. | 717/146 |
| 2002/0116382 A1 * | 8/2002 | Koyama et al. | 707/9 |
| 2003/0088857 A1 * | 5/2003 | Balva et al. | 717/137 |
| 2003/0172368 A1 * | 9/2003 | Alumbaugh et al. | 717/106 |
| 2004/0216093 A1 * | 10/2004 | Kawakatsu | 717/136 |
| 2004/0221270 A1 * | 11/2004 | Witchel et al. | 717/124 |
| 2004/0261065 A1 * | 12/2004 | Abrams et al. | 717/140 |
| 2004/0268309 A1 * | 12/2004 | Grover et al. | 717/120 |
| 2005/0015753 A1 * | 1/2005 | Meijer et al. | 717/136 |
| 2005/0132357 A1 * | 6/2005 | Shell et al. | 717/174 |
| 2006/0168130 A1 * | 7/2006 | Cox | 709/219 |
| 2006/0271920 A1 * | 11/2006 | Abouelsaadat | 717/137 |
| 2007/0073786 A1 * | 3/2007 | Laird et al. | 707/201 |
| 2009/0210864 A1 * | 8/2009 | Oberhauser et al. | 717/140 |
| 2009/0259676 A1 * | 10/2009 | Yamada et al. | 707/101 |

* cited by examiner

*Primary Examiner* — Insun Kang
(74) *Attorney, Agent, or Firm* — Thomas, Kayden, Horstemeyer & Risley, LLP

(57) ABSTRACT

Included are embodiments of a description language program stored in a computing device for updating a first version of a computer program. In at least one embodiment, the first version of the computer program is written in a universal format and the program includes logic configured to receive an updated version of the computer program. Other embodiments include logic configured to retrieve the first version of the computer program and logic configured to translate the updated version of the computer program from a proprietary format to the universal format. Still other embodiments include logic configured to utilize at least one tag to compare the translated updated version of the computer program with the first version of the computer program.

15 Claims, 17 Drawing Sheets

| A | B | C | D | RESULT | |
|---|---|---|---|---|---|
| 0 | 0 | 0 | 0 | 0 | |
| 0 | 0 | 0 | 1 | 0 | |
| 0 | 0 | 1 | 0 | 0 | ← 102 |
| 0 | 0 | 1 | 1 | 1 | |
| 0 | 1 | 0 | 0 | 0 | |
| 0 | 1 | 0 | 1 | 0 | ← 114 |
| 0 | 1 | 1 | 0 | 0 | |
| 0 | 1 | 1 | 1 | 1 | |
| 1 | 0 | 0 | 0 | 0 | |
| 1 | 0 | 0 | 1 | 0 | ← 104 |
| 1 | 0 | 1 | 0 | 0 | ← 106 |
| 1 | 0 | 1 | 1 | 1 | ← 108 |
| 1 | 1 | 0 | 0 | 1 | ← 110 |
| 1 | 1 | 0 | 1 | 1 | ← 112 |
| 1 | 1 | 1 | 0 | 1 | |
| 1 | 1 | 1 | 1 | 1 | |

FIG. 1

```
C++ COMPLETE
FILE   EDIT   SEARCH   DESIGN   WAVEFORM   TOOLS   HELP include <iostream.h>
Void main (void)
{
    bool A, B, C, D, RESULT;
    CIN>> A, B, C, D;
    RESULT = (A&&B) || (C&&D);
    COUT<< RESULT;
}
```

PROGRAMMING LANGUAGE TRANSLATION SYSTEMS AND METHODS

BACKGROUND

In the field of microchip design, there is a plurality of programming languages. Depending on the particular desires of the programmer, different programming languages have different advantages. While each programming language may have similar structure and/or similar syntax, each programming language has its own nuances that other languages may not have. Similarly, while each programming language has its own advantages according to the intended use of the program, different programmers often prefer one programming language over another for reasons related to the programmer's fluency with each respective programming language.

Generally speaking, problems can occur when a first programmer desires to write a program in one programming language, and another programmer desires to view (or implement) the program using a different programming language. Similar problems can occur when the programmer writes the program in a first programming language, but wishes to execute the program using a different programming language. While current methods include forms driven generation of software programs, these methods may have shortcomings when one version of the program is updated and/or changed.

To remedy these issues, the programmer who desires that the program be written or executed in a different program may have to manually convert the program into the desired format. Manually translating the program into a different programming language requires fluency in each programming language, and oftentimes extensive logical reasoning to adapt the program from the first language to the second programming language. Additionally, if a third programmer desires the program be translated to a third programming language, similar steps may need to be performed to accommodate the third programmer.

Thus, a heretofore unaddressed need exists in the industry to address the aforementioned deficiencies and inadequacies.

SUMMARY

Embodiments of the present disclosure include a method for providing a templated environment for computer programming. At least one embodiment includes a first version of the computer program that is written in a universal format. In this embodiment, the program includes logic configured to receive an updated version of the computer program. Other embodiments include logic configured to retrieve the first version of the computer program and logic configured to translate the updated version of the computer program from a proprietary format to the universal format. Still other embodiments include logic configured to utilize at least one tag to compare the translated updated version of the computer program with the first version of the computer program.

Additionally included is a method in a computing environment for updating computer programs. At least one embodiment of a method includes providing a user interface that includes a user option for changing a first version of a computer program, the first version of the computer program being derived from a master document. Other embodiments include receiving, via the user interface, a second version of the computer program, the second version of the computer program including at least one change from the first version of the computer program, the second version of the computer program further including at least one tag. Still other embodiments include automatically updating the master document to reflect the at least one change in the second version of the computer program.

Other systems, methods, features, and advantages of this disclosure will be or become apparent to one with skill in the art upon examination of the following drawings and detailed description. It is intended that all such additional systems, methods, features, and advantages be included within this description, and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 1 is a truth table illustrating exemplary outputs associated with a plurality of inputs.

FIG. 5 is a display of an exemplary computer program written in C++ according to the truth table from FIG. 1.

DETAILED DESCRIPTION

Generally speaking, engineers and programmers are often faced with a problem that can be more easily solved with a computer program or digital logic. As a programmer attempts to solve the problem, sometimes it is easier to describe the logic as behavioral logic, while other times it is easier to describe the solution in architecture. Depending on the problem at hand, the programmer may desire to create logical expressions to determine the desired architecture or simply desire to write a computer program to solve the problem.

FIG. 1 is a truth table illustrating exemplary outputs associated with a plurality of inputs. The outputs illustrated can be determined based on a state machine or other tool for determining logical solutions. An engineer, programmer, or designer can determine desired outputs according to the problem and desired solution. As illustrated in the truth table of FIG. 1, the inputs that correspond to a logical "1" output are denoted on lines 102-114. The inputs in these lines may then be input into a Karnaugh Map to determine a logical expression to describe the outputs of the truth table in FIG. 1.

Figure 2:
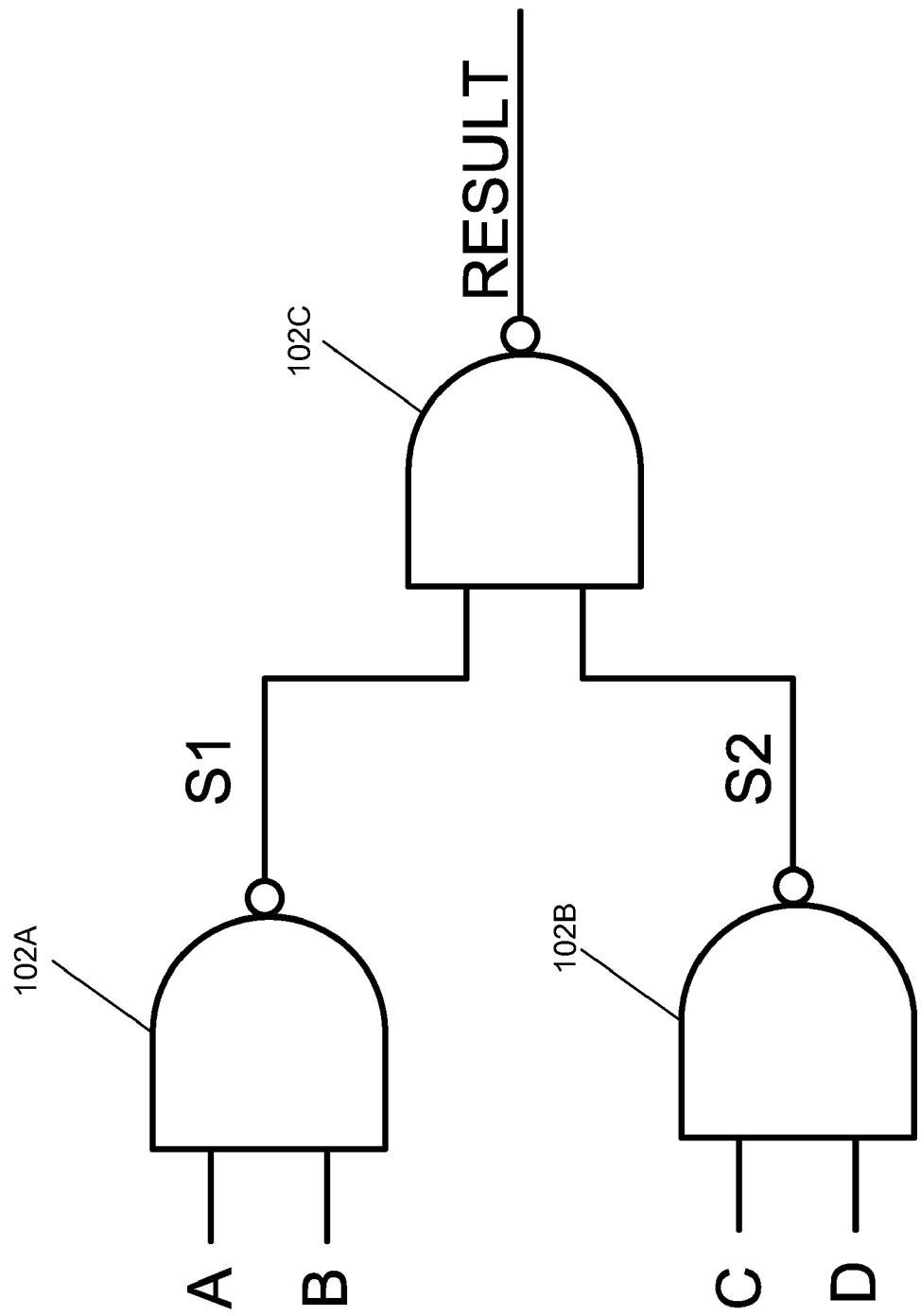
FIG. 2 is a circuit diagram illustrating exemplary logic that a programmer can use to describe the truth table from FIG. 1.

FIG. 2 is a circuit diagram illustrating exemplary logic that a programmer can use to describe the truth table from FIG. 1. As illustrated, the circuit of FIG. 1 includes three NAND gages 102a, 102b, and 102c. The first NAND gate 102a receives two inputs A and B. Similarly, the second NAND gate 102b receives two inputs C and D. The results from NAND gate 102a and NAND gate 102b are then sent as internal signals S1 and S2 to NAND gate 102c. The resulting output is denoted "RESULT." While the logic depicted in FIG. 2 is illustrated as a logical circuit, one should note that data from the truth table in FIG. 1 can also be represented as the equation RESULT=AB+CD or as the equation RESULT = $\overline{(\overline{A*B})*(\overline{C*D})}$. Similarly, a computer program, configuration of transistors, and/or a programmable chip, can each be used to create a plurality of different solutions to represent the truth table from FIG. 1.

Figure 3:
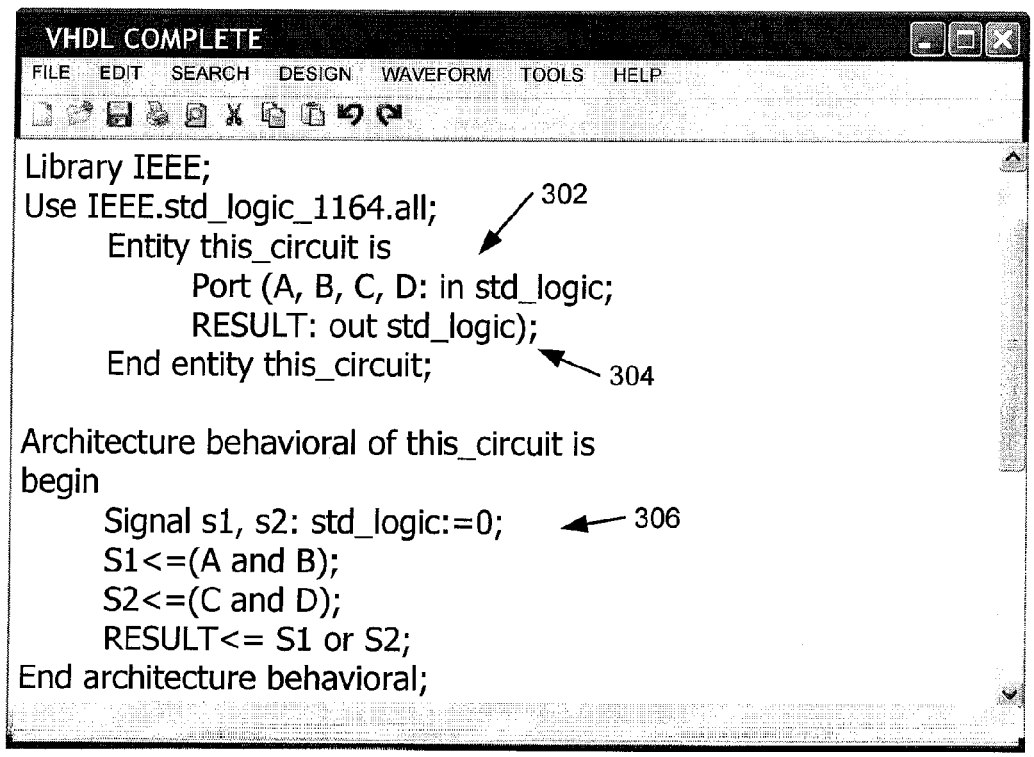
FIG. 3 is a display of an exemplary (VHDL) program for describing results of the truth table from FIG. 1.

FIG. 3 is a display of an exemplary VHDL program for describing results of the truth table from FIG. 1. More specifically, Very High Speed Integrated Circuit Hardware Description Language (abbreviated as VHSIC-HDL or VHDL) is a programming language that provides the capability to program (or re-program) a computer chip. The VHDL program illustrated in FIG. 3 defines input ports "A," "B," "C," and "D" at 302 and defines output port "RESULT" at 304, as illustrated in FIGS. 1 and 2. As illustrated at section 306, the VHDL program further defines internal signals "S1" and "S2." S1 is defined as signal A logically "ANDed" with signal B. Similarly, S2 is defined as signal C logically "ANDed" with signal D. RESULT is defined as internal signal S1 logically "ORed" with internal signal S2. One should note that, as illustrated in the circuit from FIG. 2, varying logical implementations can be used to describe the desired output. While FIG. 2 illustrates a circuit with "NAND" gates, the VHDL program of FIG. 3 describes the circuit (or the behavior of the circuit) using the logical operators "AND" and "OR."

Figure 4:
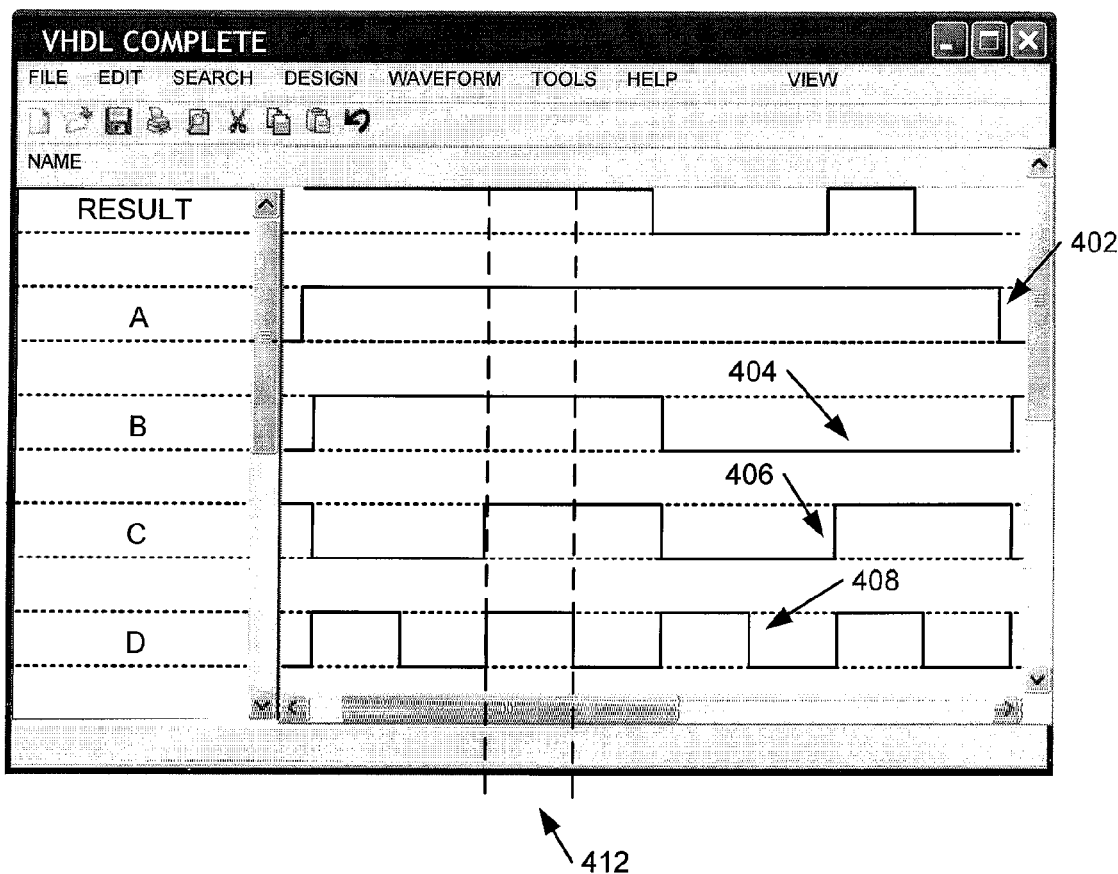
FIG. 4 is a display of an exemplary test sequence for the VHDL program from FIG. 3.

FIG. 4 is a display of an exemplary test sequence for the VHDL program from FIG. 3. As illustrated, the inputs A, B, C, and D are shown at various logical states, as illustrated with waveforms 402, 404, 406, and 408. According to the waveforms 402-408, as the inputs are situated in a certain configuration, RESULT has a corresponding logical state, according to the VHDL program in FIG. 3. More specifically, the selected portion of the waveforms for A, B, C, D, and RESULT 412 correspond to row 112 in FIG. 1. One should note that upon creating the program from FIG. 4, a programmer can simulate and/or synthesize the created logic using a test forum as shown in FIG. 5. While a variety of test data can be used, the test data related to inputs A, B, C, and D in FIG. 5 correlates with data related to A, B, C, and D in FIG. 1.

FIG. 5 is a display of an exemplary computer program written in C++ according to the truth table from FIG. 1. As illustrated, the variables A, B, C, D, and RESULT are defined as Boolean operators, as denoted in line 502. Line 504 provides a way to receive inputs for the variables A, B, C, and D. Line 506 defines RESULT as a logical expression of inputs A, B, C, and D. The logical expression is defined as A(AND)B (OR) C(AND)D using C++ syntax. Line 508 provides for the output of RESULT. One should note that although the programs illustrated in FIGS. 4 and 5 are written in different programming languages and with a different implementation, they should hold similar results. However, the interoperability of these programs (or lack thereof) can make translation between these languages difficult.

While a programmer may desire to implement the logic of FIGS. 1 and 2 as various types of programming languages, there is generally much difficulty regarding the translation and interoperability of programs written in a specific programming language. As a nonlimiting example, if a user writes a program in VHDL, there is often difficulty translating this program into C++. Similarly, after the translation is complete, the programmer may desire that any additions, revisions, and updates that may be created on the VHDL also be changed in the C++ program.

Figure 6:
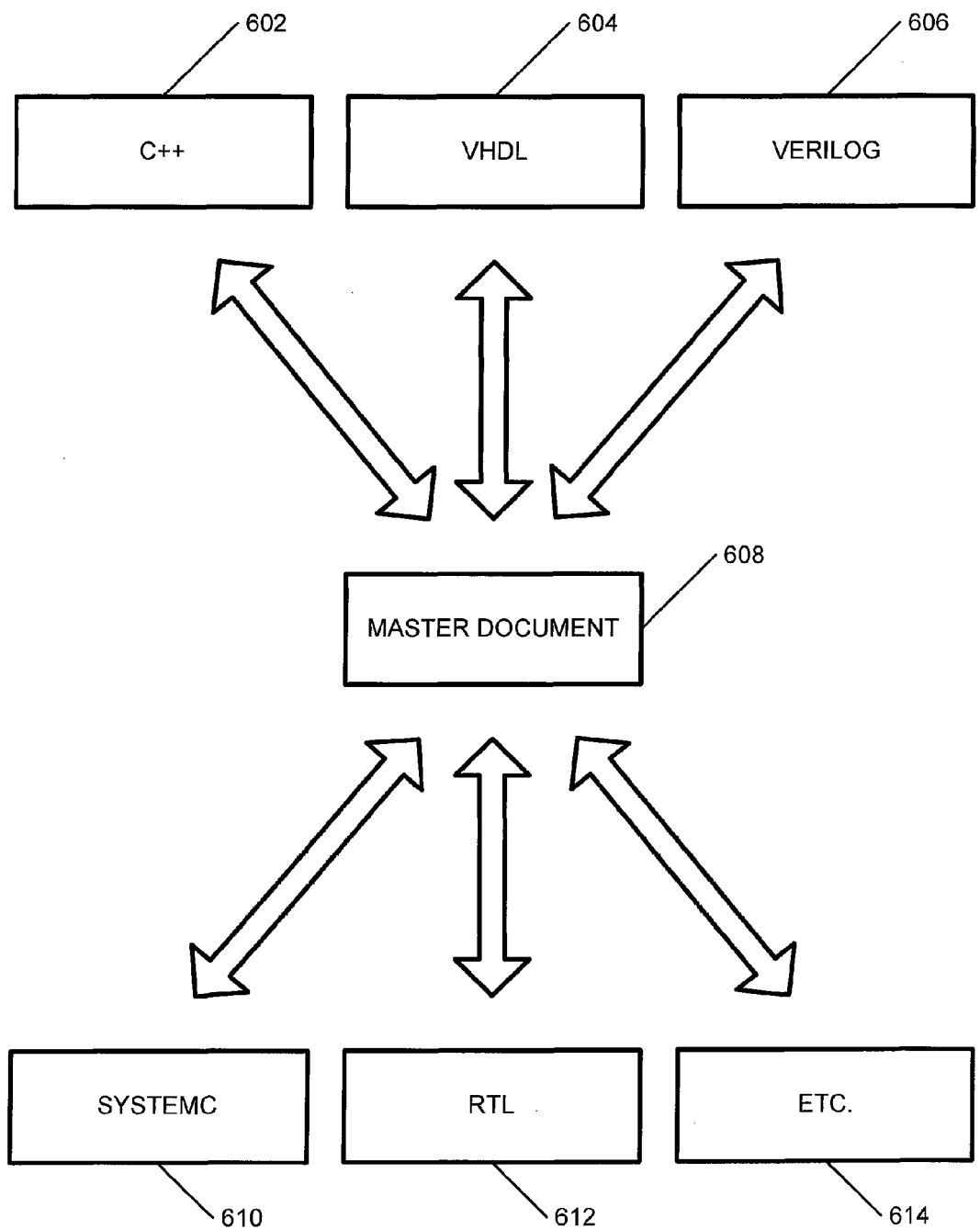
FIG. 6 is a functional block diagram illustrating use of a master document for conversion to and from any of a plurality of different programming languages.

FIG. 6 is a functional block diagram illustrating use of a master document for conversion to and from any of a plurality of different programming languages such as the Verilog program and C++ program from FIGS. 3 and 5. As illustrated, a master document 608 can be created in a universal format for translating to any of a plurality of programming languages. Illustrated in FIG. 6, the master document 608 can be configured to translate programs to and from C++ 602, VHDL 604, Verilog 606, SystemC 610, Register Transfer Level (RTL) 612, and other programs 614. As discussed in more detail below, the master document can be created from a user interface that can be stored on a computer or network. Users can then call the master document 608 to be translated into the desired programming language. Upon being called, a copy of the master document 608 can be stored in the programming language requested, such that if a user wishes to recall the master document 608 in the same programming language, no translation is needed. Additionally, upon translating the master document 608 into a programming language, such as into one of the programming languages illustrated in FIG. 6, the programmer can update, revise, or amend the translated master document 608. When the update is complete, the user can then store the revised program. The master document 608 can then be updated according to the revisions. Additionally, any other translated copies of the master document 608 can also be updated according to the new revisions.

More specifically, in at least one embodiment a user calls a program in a certain format (e.g., C++). The user then makes updates and/or changes to the program. The updated version of the program can be tagged such that the master document can be updated. By tagging the updated program and updating the master document, the ongoing design intent can be properly captured.

Figure 7:
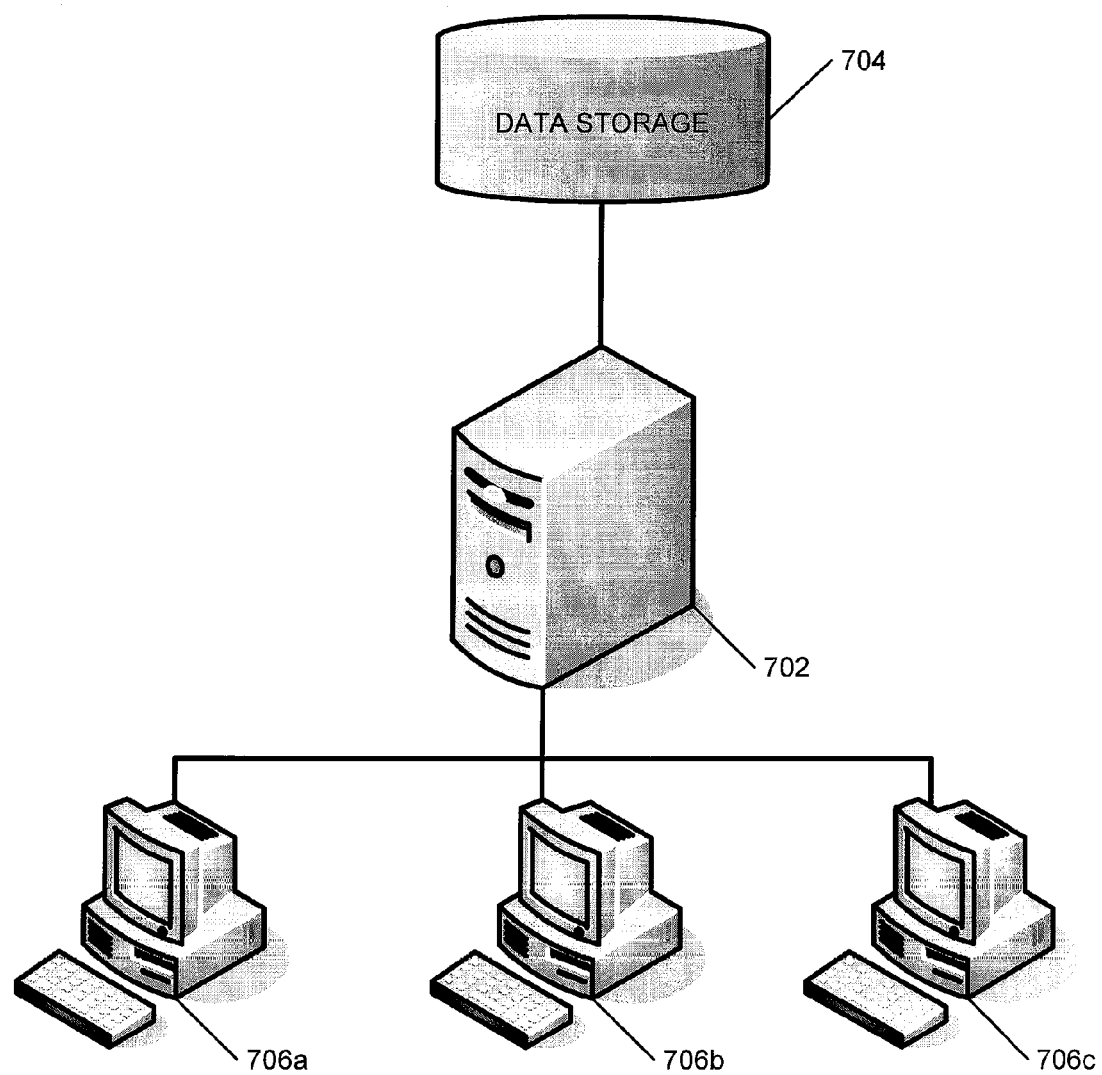
FIG. 7 is an illustration of a network configuration, in which the master document from FIG. 6 can be implemented.

FIG. 7 is an illustration of a network configuration in which the master document from FIG. 6 can be implemented. As discussed above, the master document 608 can be stored on any one of the user devices 706a, 706b, 706c, or any combination thereof. Additionally, some embodiments of this disclosure provide for storing the master document 608 on the server 702 or data storage 704. In one nonlimiting example, the master document 608 is stored in data storage 704, which can include a database or other data storage logic. A first user operating user device 706a can access the master document 608 by making a request from the user device 706a to the server 702. The server 702 can call the master document 608 from data storage 704. Depending on the implementation, software on the server 702 can then translate the master document 608 into the programming language requested by the user. In such a scenario, the translated program is communicated to the user device 706a. Additionally, once the program is translated, an additional copy can be sent to data storage 704. The stored copy of the program can be used to reduce duplicative translating by the server 702. Thus, if a user operating user device 706b wishes to view the master document in the same programming language as the user at user device 706a, the server 702 simply calls the previously translated program from data storage 704 and communicates this data to the user device 706b.

Additional embodiments can be configured such that the translation logic is located on the user device, such as user device 706c. In such a configuration, if a user at user device 706c wishes to view the master document 608 in VHDL format, the user can contact the server 702 for the master document 608. The server 702 could retrieve a copy of the master document 608 from data storage 704 and send this to the user device 706c. The user device 706c could then make the desired translation. Upon completion of viewing, executing, or updating the VHDL version of the master document 608, logic on the user device 706c could communicate the current VHDL version of the master document 608 to the server 702. The server 702 can then store the VHDL version of the master document 608 on data storage 704.

Other embodiments can also be configured to provide the owner of the master document 608 with control over updates of the master document from other users. More specifically, if the user on user device 706a creates a program for which a master document 608 is created, the user can have owner control over that document. If the master document 608 is stored in data storage 704, other users, such as a user operating user device 706b can access and review the master document 608 in any of a plurality of different programming languages, such as Verilog. However, in order to update or otherwise change the un-translated master document, the user on user device 706b must get permission from the master document 608 owner. Permission can be facilitated by the translation logic sending a request for permission to the master document owner. If the master document owner authorizes the updates, the Verilog program can be converted to a universal format, and saved as the master document 608. Additionally, the Verilog copy of the program can be retained and stored in data storage as well. Additionally, if the master document 608 has been saved in different programming languages, these copies can also be updated according to the approved updates.

While some embodiments include updating all existing versions of the master document 608, other embodiments include updating only the master document 608 upon approval by the master document owner. Existing copies of the master document 608 that have been translated into various programming languages may not be updated until called by a user. As a nonlimiting example, if a user operating user device 706b updates the master document using C++ and the master document owner approves the update, the C++ program can be communicated to the server 702. Logic on the server can then incorporate the updates into the master document 608. The updated version of the C++ program may be retained and stored with the master document 608 in data storage 704. At this time an existing SystemC version of the master document 608 will not be updated. If a user operating user device 706c then decides to view the master document 608 in a SystemC format, the existing SystemC program is called, is compared with the master document 608, and is updated accordingly.

Figure 8:
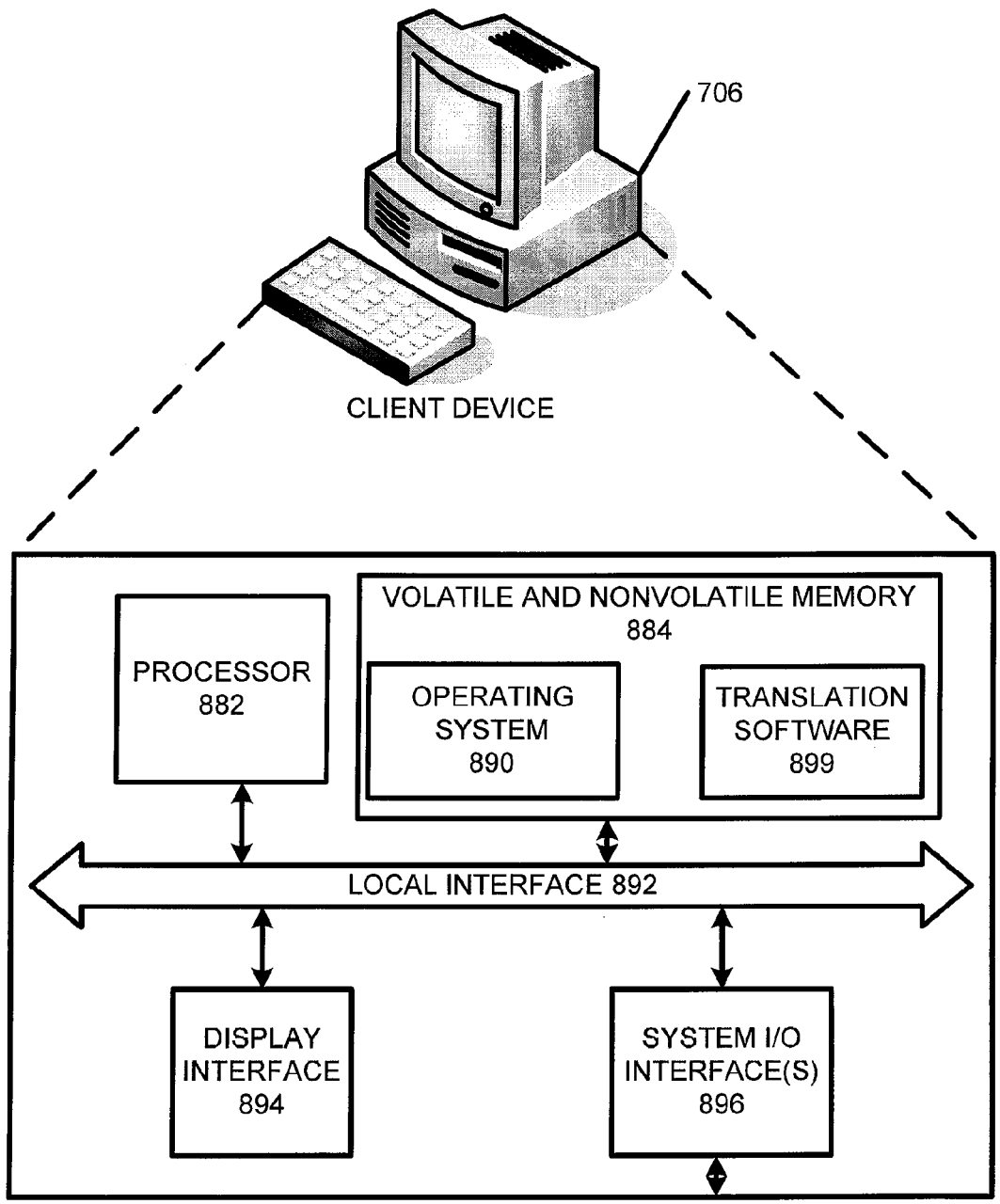
FIG. 8 is a functional diagram illustrating an exemplary embodiment of a client device that may be configured to communicate via a communications network such as the network from FIG. 7.

FIG. 8 is a functional diagram illustrating an exemplary embodiment of a client device that may be configured to communicate via a communications network such as the network from FIG. 7. Generally, in terms of hardware architecture, as shown in FIG. 8, the client device 706 includes a processor 882, volatile and nonvolatile memory 884, and one or more input and/or output (I/O) device interface(s) 896 that are communicatively coupled via a local interface 892. The local interface 892 can be, for example but not limited to, one or more buses or other wired or wireless connections. The local interface 892 may have additional elements, which are omitted for simplicity, such as controllers, buffers (caches), drivers, repeaters, and receivers to enable communications. Further, the local interface 892 may include address, control, and/or data connections to enable appropriate communications among the aforementioned components. The processor 882 is a hardware device for executing software, particularly software stored in volatile and nonvolatile memory 884.

The processor 882 can be any custom made or commercially available processor, a central processing unit (CPU), an auxiliary processor among several processors associated with the client device 706, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard® Company, an 80×86 or Pentium® series microprocessor from Intel® Corporation, a PowerPC® microprocessor from IBM®, a Sparc® microprocessor from Sun Microsystems®, Inc, or a 68xxx series microprocessor from Motorola® Corporation.

The volatile and nonvolatile memory 884 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 884 may incorporate electronic, magnetic, optical, and/or other types of storage media. Note that the volatile and nonvolatile memory 884 can have a distributed architecture, where various components are situated remote from one another, but can be accessed by the processor 882.

The software in volatile and nonvolatile memory 884 may include one or more separate programs, each of which includes an ordered listing of executable instructions for implementing logical functions. In the nonlimiting example of FIG. 8, the software in the volatile and nonvolatile memory 884 may include Translation client software 899, as well as an operating system 890. A nonexhaustive list of examples of suitable commercially available operating systems is as follows: (a) a Windows® operating system available from Microsoft® Corporation; (b) a Netware® operating system available from Novell®, Inc.; (c) a Macintosh® operating system available from Apple® Computer, Inc.; (d) a UNIX operating system, which is available for purchase from many vendors, such as the Hewlett-Packard® Company, Sun Microsystems®, Inc., and AT&T® Corporation; (e) a LINUX operating system, which is freeware that is readily available on the Internet; (f) a run time Vxworks® operating system from WindRiver® Systems, Inc.; or (g) an appliance-based operating system, such as that implemented in handheld computers or personal data assistants (PDAs) (e.g., PalmOS® available from Palm® Computing, Inc., and Windows CE® available from Microsoft® Corporation). The operating system essentially controls the execution of other computer programs and provides scheduling, input-output control, file and data management, memory management, and communication control and related services.

A system component embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 884, so as to operate properly in connection with the Operating System.

Input/Output devices that may be coupled to system I/O Interface(s) 896 may include input devices, for example but not limited to, a keyboard, mouse, scanner, microphone, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

If the client device 706 is a Personal Computer, workstation, or the like, the software in the volatile and nonvolatile memory 884 may further include a basic input output system (BIOS) (omitted for simplicity). The BIOS is a set of essential software routines that initialize and test hardware at startup, start the Operating System, and support the transfer of data among the hardware devices. The BIOS can be stored in ROM so that the BIOS can be executed when the client device 706 is activated.

When the client device 706 is in operation, the processor 882 is configured to execute software stored within the volatile and nonvolatile memory 884, to communicate data to and from the volatile and nonvolatile memory 884, and to generally control operations of the client device 706 pursuant to the software. Software in memory, in whole or in part, can be read by the processor 882, perhaps buffered within the processor 882, and then executed.

One should note that while the above description with respect to FIG. 8 refers to components of a client device 706, some or all of these components may also be present in a server, such as the server 702 from FIG. 7. More specifically, while the translation software 899 (and master document) can be located in volatile and nonvolatile memory 884 of client device 706, in some embodiments translation software 899 can be located on the server 702 or in data storage 704. Thus the components described with reference to FIG. 8 can be applied to a client device 706 or a server 702 or both, depending on the desired configuration.

Figure 9:
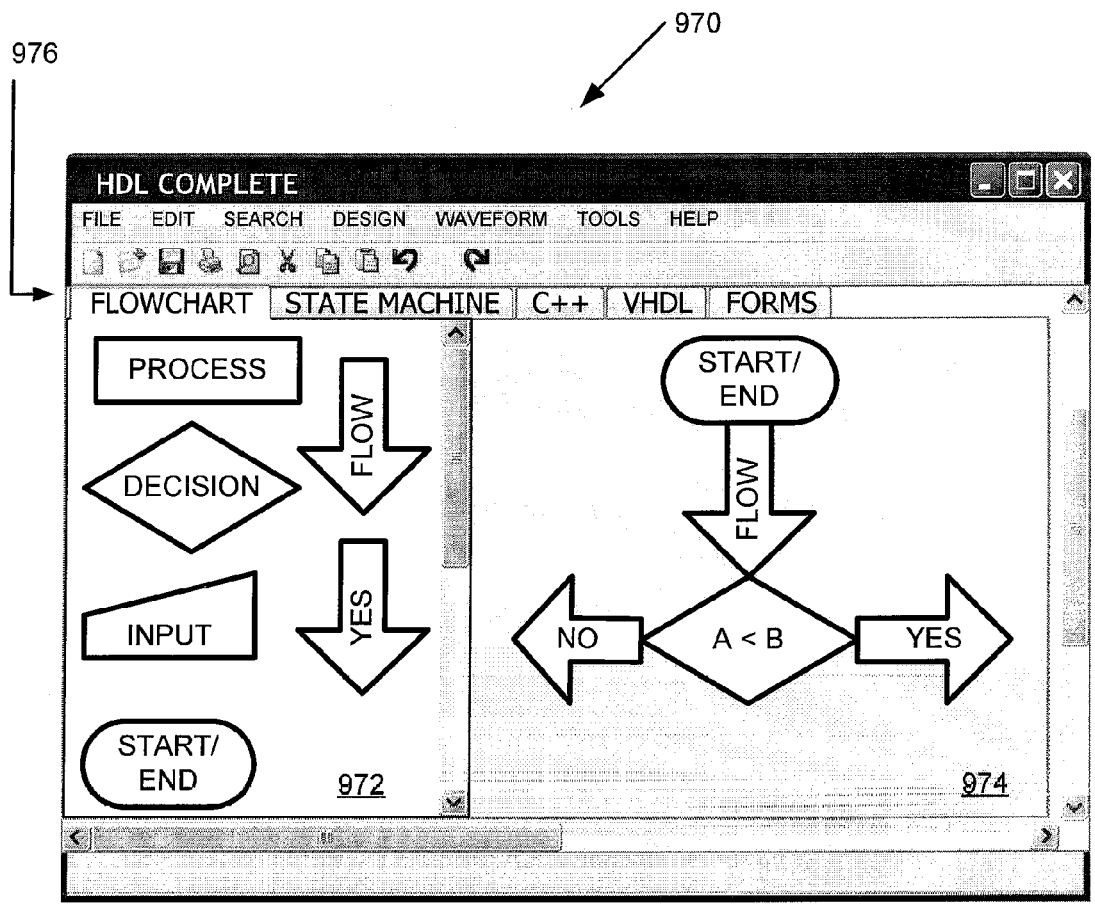
FIG. 9 is a display from an exemplary templated translation software interface for creating a flowchart, as illustrated in FIG. 6.

FIG. 9 is a display from an exemplary templated translation software interface for creating a flowchart, as illustrated in FIG. 6. As shown in this nonlimiting example, display 970 includes a plurality of tabs 976 by which a programmer can write a program in any of a plurality of programming languages. More specifically, the programmer can write a program via a flowchart, via a state machine, via C++, via VHDL, and/or via a forms template. As one of ordinary skill in the art will understand, other languages and logical formats, such as Verilog, SystemC, and others can also be included in this list.

As shown in window 972, a plurality of flowchart shapes are available to a programmer for creating a logical expression. In this nonlimiting example, a "process" block, a "decision" block, an "input" block, a "start/end" block, a "flow" block, and a "yes" block are shown. From the blocks available in window 972, a programmer can create a logical expression in window 974. The logical expression can include any of the items from window 972 to create the desired functionality.

Depending on the configuration, once the programmer creates the desired flowchart according to the FIG. 9, the programmer can save the flowchart. Upon saving the flowchart, the translation software 899 can create a master document 608 from the created flowchart. While the master document 608 can be written in a universal format, an existing format can be used as well. As a nonlimiting example, after the programmer creates the flowchart illustrated in window 974, the user can execute a save function. The translation software 899 can save the flowchart in the volatile and nonvolatile memory component 884. Additionally, the translation software 899 can create a master document 608 in a universal format. The master document 608 may or may not be a format that is directly perceivable by a user. The master document 608 may simply be a configuration of data for easily translating to various programming languages.

As an additional nonlimiting example, instead of creating a master document 608 in a universal format, the translation software 899 translates the flowchart into a predetermined format, such as VHDL. The translation software 899 can then save both the flowchart and the VHDL in the volatile and nonvolatile memory 884. Other embodiments can allow for a created program to be saved in its current state, without creating a second document in a predetermined format. The flowchart could then be translated when a user requests the program in a different programming format.

Figure 10:
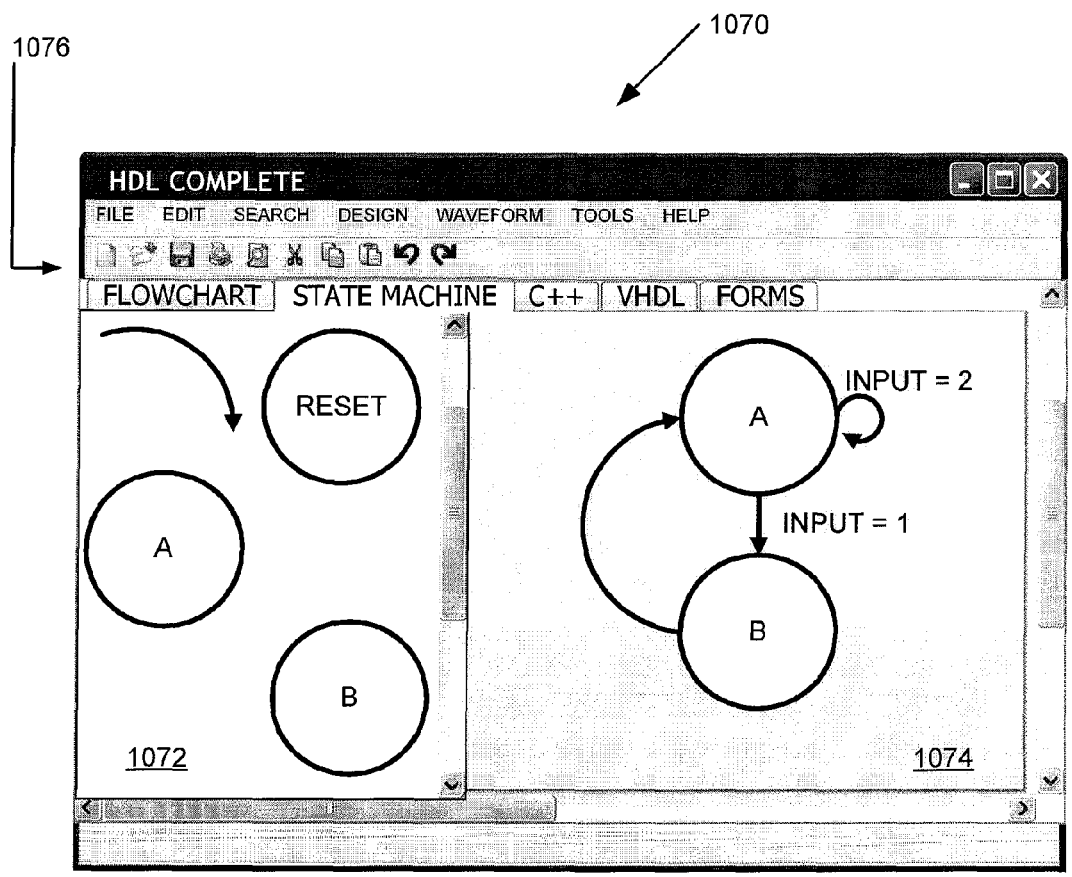
FIG. 10 is a display from an exemplary templated translation software interface for creating a state machine, similar to the display of FIG. 9.

FIG. 10 is a display from an exemplary templated translation software interface for creating a state machine, similar to the display of FIG. 9. As shown, display 1070, includes tabs 1076, with the "state machine" tab being selected. Similar to FIG. 9, on the left side of the display 1070 includes window 1072 that includes various state machine components. The programmer can create a state machine in window 1074 by using the shapes from window 1072 in window 1074. As discussed with reference to FIG. 9, upon completion of the state machine, the translation software can save a master document 608 related to the state machine for subsequent translation into any of a plurality of programming languages. Additionally, simulation logic for the state machine can also be available to determine proper operation of the created state machine.

Figure 11:
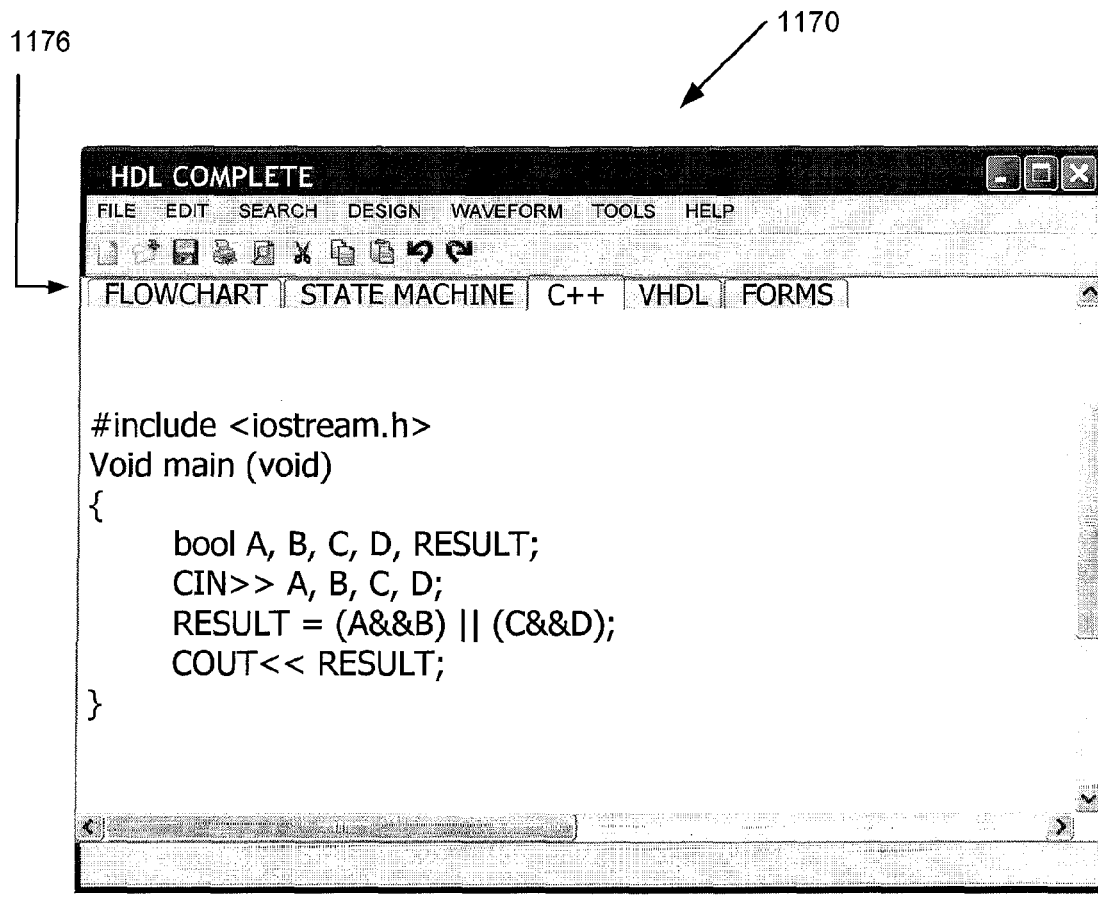
FIG. 11 is a display from an exemplary templated translation software interface for creating a C++program, similar to the display of FIG 9.

FIG. 11 is a display from an exemplary templated translation software interface for creating a C++program, similar to the display of FIG. 9. As shown in display 1170, the tabs 1176 include a selected C++tab. Upon selecting the C++tab, a programmer can be provided with a text area and compiler for creating and executing a C++program. Upon creating the C++program, the programmer can save the program as a master document 608. The programmer can then claim control over the master document 608 such that the programmer can approve any changes in the program. Additionally, the master document 608 as well as the original C++version of the program can be saved in volatile and nonvolatile memory 884.

Figure 12:
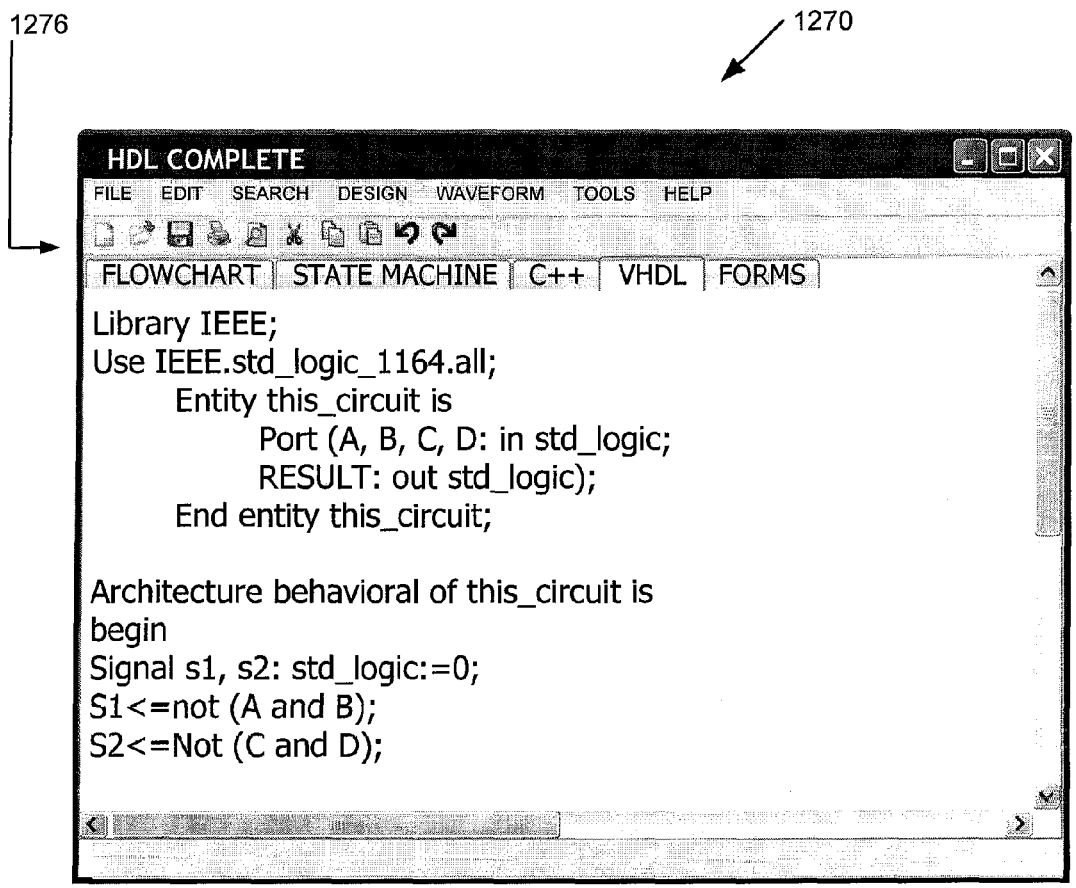
FIG. 12 is a display from an exemplary templated translation software interface for creating a VHDL program, similar to the display of FIG. 9.

FIG. 12 is a display from an exemplary templated translation software interface for creating a VHDL program, similar to the display of FIG. 9. As shown, the VHDL program from FIG. 3 is illustrated in display 1270 under the selected VHDL tab 1276. As discussed above with reference to FIG. 11, display 1270 includes a text area and simulator for creating and simulating a VHDL program. Also similar to above, once the programmer creates a VHDL program, the programmer can save the VHDL program as a master document 608 and can designate himself or herself as the master document owner. Depending on the particular configuration, the master document 608 (as well as the VHDL version of the program) can be saved on a server 702 such that other users can have access to the master document 608. When a user wishes to view the master document 608 in a particular programming language, the translating software can determine whether an updated version of the master document 608 in that language exists. If it does, the server can communicate that version of the master document 608 to the requesting user. If an updated version of the master document 608 does not exist in the requested programming language, the translation software can then create such a document and communicate the newly created program to the requesting user.

Figure 13:
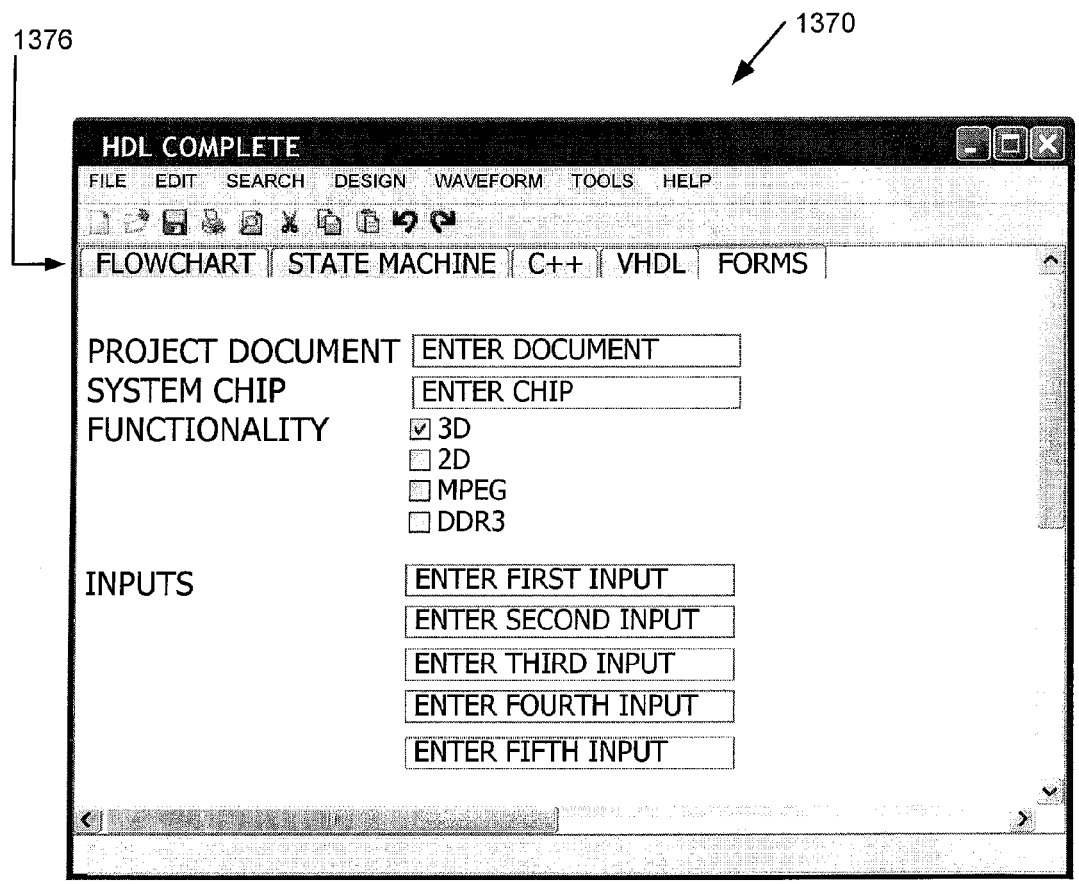
FIG. 13 is a display from an exemplary templated translation software interface for creating a logical expression using templated forms, similar to the display of FIG. 9.

FIG. 13 is a display from an exemplary templated translation software interface for creating a logical expression using templated forms, similar to the display of FIG. 9. As shown in display 1370, the forms tab 1376 is selected, which provides a programmer with a plurality of options by which to create a logical expression. One should note that the forms can facilitate the creation of a program (or chip architecture) by providing checkboxes and other user options for selecting various functions of the desired logical expression. Additionally, the forms window can also provide a text area for entering logical expressions related to the desired programming scheme.

Depending on the particular configuration, the forms window can include a "programming language" checkbox that a programmer can select. The programmer can then enter the desired logical expressions according to the selected programming language. Other configurations can provide the programmer with the desired programming functionality through a templated form, without the programmer needing to create a textual program. The templated form can include a series of selections that a programmer can make to create the desired logic.

Once the templated form is completed, the programmer can save the created logical expression in its current form as well as a saving the logical expression master document 608, as discussed above. Similarly as discussed above, the programmer can designate owner status, and the master document 608 can be stored in volatile and nonvolatile memory 884.

Figure 14:
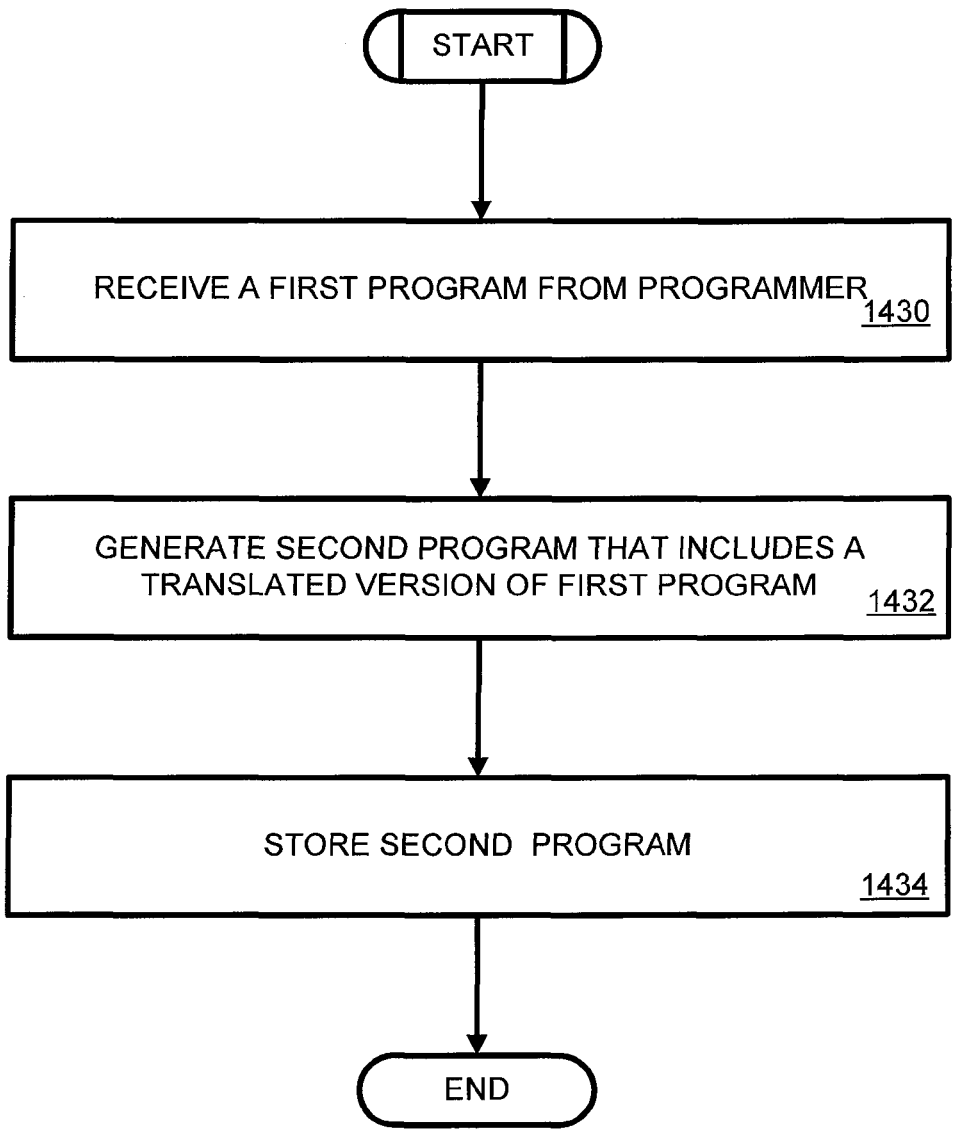
FIG. 14 is a flowchart illustrating exemplary steps that can be taken in creating a master document in the configuration from FIG. 6.

FIG. 14 is a flowchart illustrating exemplary steps that can be taken in creating a master document in the configuration from FIG. 6. The first step in FIG. 14 is to receive a program from a programmer (block 1430). As discussed above, the program can be written in a first programming language. The next step in this nonlimiting embodiment is to translate the first program into a universal format (block 1432). A second program can be generated, where the second program includes a translated form of the first program in a second language. The second language can be written in a universal format, however this is not a requirement. Once the second program is generated, the second program can be stored in the universal format (block 1434). In some embodiments the steps described above can be completed by a server, such as server 702 from FIG. 7. The programmer on user device 706 can create a program, which is then sent to server 702. In other embodiments, however the user device 706 can complete the above mentioned steps.

Figure 15:
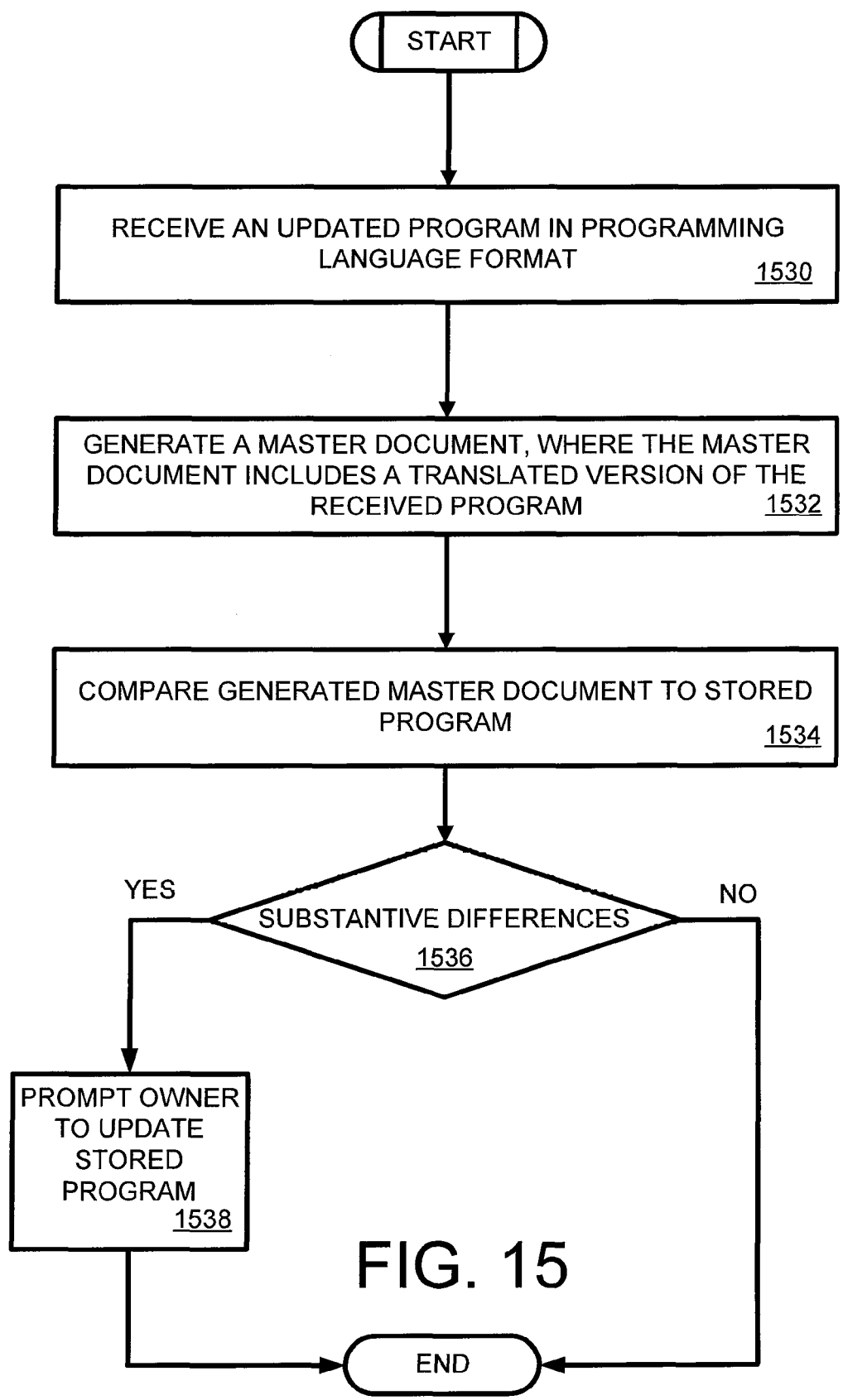
FIG. 15 is a flowchart illustrating exemplary steps that can be taken to update a master document, such as the master document from FIG. 6.

FIG. 15 is a flowchart illustrating exemplary steps that can be taken to update a master document, such as the master document from FIG. 6. As stated above with respect to FIG. 14, a user device 706 or a server 702 can perform the steps discussed with respect to FIG. 15. The first step of FIG. 15 is to receive an updated program in a programming language format (block 1530). The programming language format can include any programming language for example, but not limited to C++, VHDL, Verilog, SystemC, RTL, flowchart, state machine, a template form, etc. As a nonlimiting example, a programmer who accesses a master document may request the master document in a VHDL compatible programming language. After the programmer receives the program, the programmer may make changes to the VHDL version of the program. The updated VHDL version of the program can be tagged to indicate the changes made. Block 1530 includes receiving the updated VHDL version of the program from the programmer Next, translation software can generate a master document where the master document includes a translated version of the updated program (block 1532). The updated program can include at least one tag that can clearly define the changes that are made, thereby preserving the ongoing design intent of the program. The translated version of the received program can then be written in a universal format, however this is not a requirement. Once the master document is created, (such as in the universal format), a comparison with a stored version of the master document 608 is made (block 1534). If there are substantive differences between the stored master document 608 and the generated master document (block 1536), the translation software 899 can prompt the owner of the master document 608 to accept the changes (block 1538). If there are no substantive changes between the two documents, the stored master document 608 is left unchanged.

Depending on the desired configuration, if the master document owner does not accept the changes in block 1538, the programmer who made the changes can have the option to create a new master document that is distinct from the stored master document. Other embodiments can include an option to save the changed program as a derivative of the master document. Such a configuration could enable a link to remain with the master document, while still preserving the functionality of both the master document and the newly created program.

Figure 16:
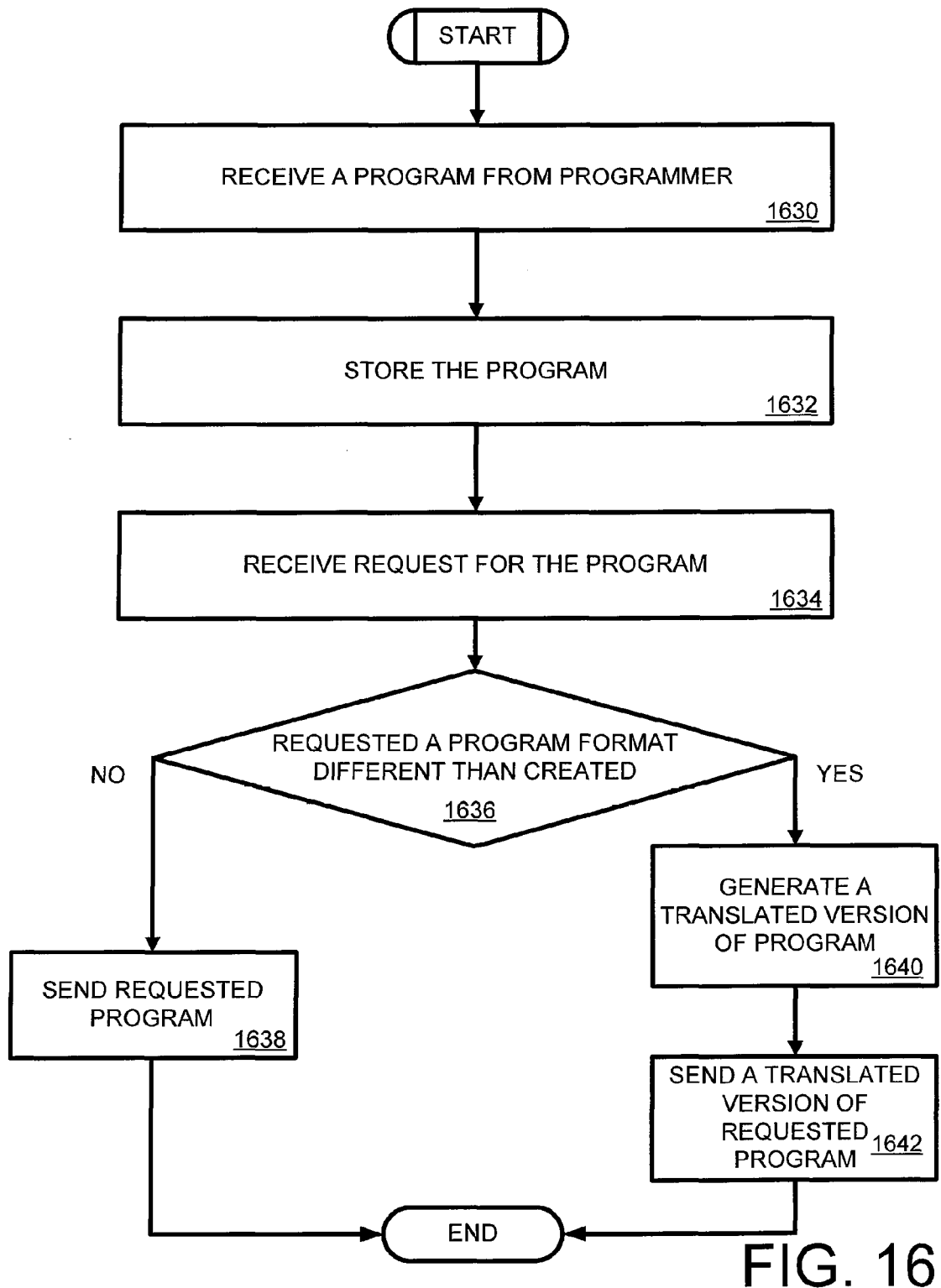
FIG. 16 is a flowchart illustrating exemplary steps that can be taken to store and receive requests related to a program created pursuant to the configuration from FIG. 6.

FIG. 16 is a flowchart illustrating exemplary steps that can be taken to store and receive requests related to a program created pursuant to the configuration from FIG. 6. As illustrated, the first step in the flowchart of FIG. 16 is to receive a program from a programmer (block 1630). As discussed above, a programmer can create a program using a programming language such as C++, VHDL, etc. When the program is complete, the programmer can send the program to a remote server, to the user device, or both. Once the program is received from the programmer, the program can be stored (block 1632). One should note that while not discussed with respect to this nonlimiting example, the programmer can also perform steps to designate "owner" status, as discussed above.

Once the program is stored, a request can be received for access to the stored program (block 1634). The request can originate from another programmer who wishes to view, execute, and/or update the stored program. Next, a determination is made as to whether the requested program format is the same as the format in which the program was created or stored (block 1636). As a nonlimiting example, a first programmer creates a program in C++ and stores the program on a server. In response to a second programmer desiring access to the program in SystemC, the flowchart can make a determination as to whether the program was created or is stored in SystemC. If the program is stored in the requested format, the program is then sent to the requesting programmer (block 1638). If, however, the program is not stored in the requested format, a new program can be generated, where the new program includes a translated version of the program, as written (block 1640). The newly generated program can then be sent to the requesting programmer in the requested format (block 1642).

One should note that in this nonlimiting example, the originally created program is not first stored as a master document 608 in a universal format. Instead, the program is stored as created, and creation of a master document 608 in a universal format does not occur until a requesting party wishes to view the program in a language different than is already stored (block 1640). Even at this point, the creation of a master document 608 in a universal format is not a necessity. In some embodiments block 1640 facilitates the creation of a master document 608 that is stored with the originally created document. Additionally, a version of the program is also created pursuant to the programming language that was requested. In this situation, all versions of the program can be stored for future retrieval.

In other embodiments, when a programmer requests the program in a programming language that is different than is stored, the stored program is simply translated into the requested format. In these embodiments, no master document in a universal format is created. The originally created document can be viewed as the master document 608, thereby reducing unnecessary translation.

Figure 17:
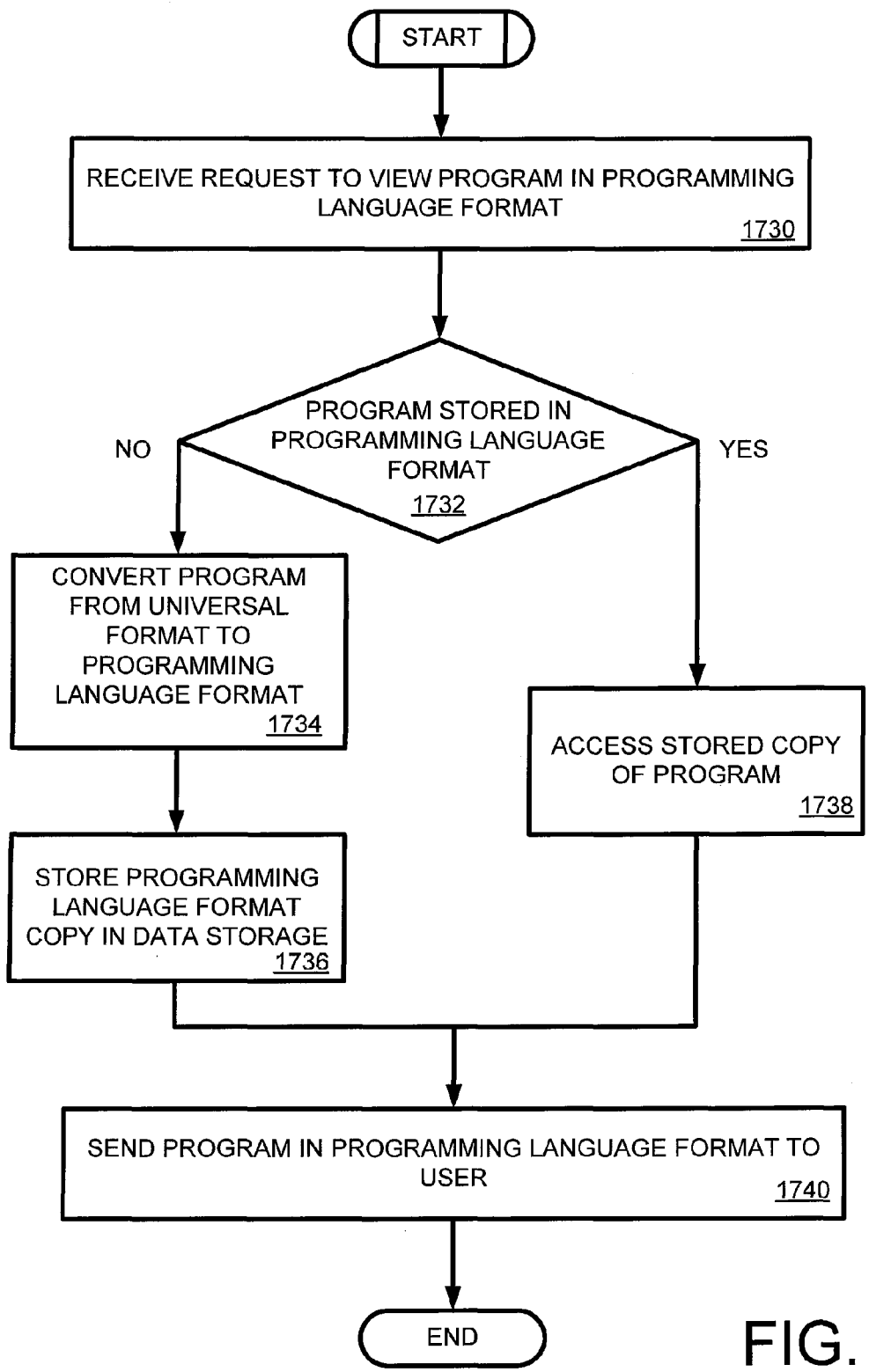
FIG. 17 is a flowchart illustrating exemplary steps that can be taken to provide a programmer with access to a program stored according to the implementation of FIG. 6.

FIG. 17 is a flowchart illustrating exemplary steps that can be taken to provide a programmer with access to a program stored according to the implementation of FIG. 6. As illustrated, the first step in the flowchart of FIG. 17 is to receive a request to view a program in a programming language format (block 1730). As stated above, a first programmer can create a program in a programming language (or a universal format), and that program can be stored (either in the programming language format, the universal format or both). The step in block 1730 is receiving a request for the program from a second programmer (or other user). The second programmer can request the program in a different programming language than the program is currently stored, but this is not a requirement.

Next, a determination is made as to whether the requested program is stored in the requested format (block 1732). If the program is stored in the requested format, the flowchart can access the stored copy of the requested program (block 1738). If, however, the requested program is not stored in the requested format, the master document 608 (which can be written in a universal format) can be converted to the requested programming language (block 1734). Next, the newly created version of the program can then be stored (block 1736). Once the requested version of the program is retrieved, the program can be sent to the requesting programmer (block 1740).

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

Additionally, the flow charts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should also note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be a variety of means that can contain, store, communicate, propagate, or transport the program for use by or in connection with the instruction execution system, apparatus, or device.

It should also be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A description language program stored in a computing device for changing a first version of a computer program, wherein the first version of the computer program is written in a universal format, the description language program comprising:

logic configured to receive a second version of the computer program in a proprietary format, wherein the second version of the computer program includes at least one change from the first version of the computer program, wherein the second version of the computer program includes at least one tag that indicates the at least one change, and wherein the proprietary format is different than the universal format;

logic configured to retrieve the first version of the computer program;

logic configured to translate the second version of the computer program from the proprietary format to the universal format;

logic configured to utilize the at least one tag to compare the translated second version of the computer program with the first version of the computer program; and logic configured to, in response to determining at least one difference between the translated second version of the computer program and the first version of the computer program, automatically update the first version of the program with the translated second version of the program.

2. The description language program of claim 1, further comprising logic configured to store at least one of the following: the first version of the computer program and the second version of the computer program in the universal format.

3. The description language program of claim 1, further comprising logic configured to store the second version of the computer program in a different format, wherein the different format is different than the universal format, wherein the different format is different than the proprietary format.

4. The description language program of claim 1, further comprising logic configured to send an authorization request to an owner of the computer program.

5. The description language program of claim 4, further comprising logic configured to receive authorization to update the computer program.

6. A method in a computing environment for updating computer programs, the method comprising:

providing a user interface that includes a user option for changing a first version of a computer program, the first version of the computer program being derived from a master document written in a universal format;

receiving, via the user interface, a second version of the computer program in a proprietary format, the second version of the computer program including at least one change from the first version of the computer program, the second version of the computer program further including at least one tag that indicates the at least one change; wherein the proprietary format is different than the universal format;

automatically translating the second version of the computer program from the proprietary format to the universal format;

comparing the translated second version of the computer program with the first version of the computer program by using the at least one tag; and in response to determining at least one difference between the translated second version of the computer program and the first version of the computer program, automatically updating the master document to reflect the at least one change in the second version of the computer program.

7. The method of claim 6, further comprising storing the second version of the computer program.

8. The method of claim 6, further comprising storing the updated version of the master document.

9. The method of claim 6, wherein the second version comprises a first format that includes at least one of the following: Verilog, VHDL, C++, RTL, and SystemC.

10. The method of claim 6, wherein the user interface is further configured to display at least one of the following: the first version of the computer program, the second version of the computer program, and the master document.

11. A system in a computing environment for updating computer programs, the system comprising:

a memory with logic; and a processor configured with the logic to:

provide a user interface configured to provide a user option for changing a first version of a computer program, the first version of the computer program being derived from a master document written in a universal format;

receive, via the user interface, a second version of the computer program in a proprietary format, the second version of the computer program including at least one change from the first version of the computer program, the second version of the computer program further including at least one tag that indicates the at least one change; wherein the proprietary format is different than the universal format;

automatically translate the second version of the computer program from the proprietary format to the universal format;

compare the translated second version of the computer program with the first version of the computer program by using the at least one tag; and in response to determining at least one difference between the translated second version of the computer program and the first version of the computer program, automatically update the master document to reflect the at least one change in the second version of the computer program.

12. The system of claim 11, further comprising logic configured to store the second version of the computer program.

13. The system of claim 11, further comprising logic configured to store the updated version of the master document.

14. The system of claim 11, wherein the second version comprises a first format that is associated with at least one of the following: Verilog, VHDL, C++, RTL, and SystemC.

15. The system of claim 11, wherein the user interface is further configured to display at least one of the following: the first version of the computer program, the second version of the computer program, and the master document.

* * * * *